Figure 1:
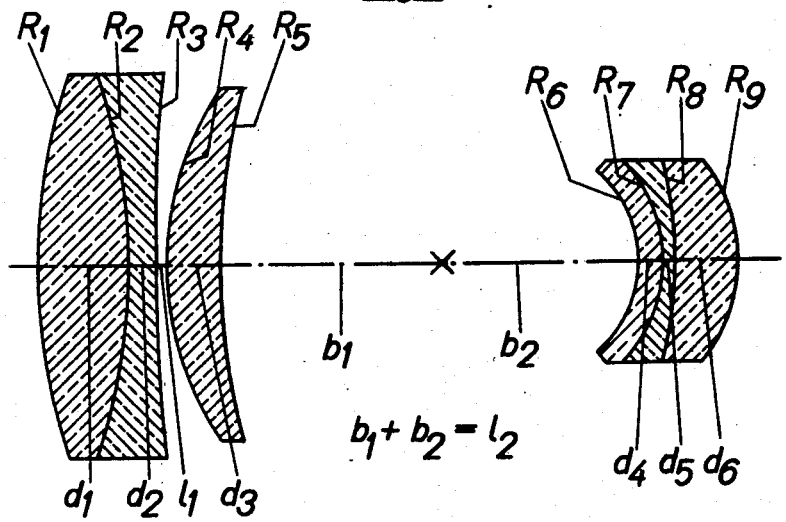

Feb. 25, 1958  C. BAUR ET AL  2,824,492

TELEPHOTO LENS

Filed Dec. 23, 1955

INVENTORS:
*Carl BAUR Christian OTZEN*

Connolly and Hutz
Attorneys

United States Patent Office 2,824,492
Patented Feb. 25, 1958

2,824,492

TELEPHOTO LENS

Carl Baur, Baldham, and Christian Otzen, Munich, Germany, assignors to Agfa Camera-Werk Aktiengesellschaft, Munich, Germany, a corporation of Germany Application December 23, 1955, Serial No. 555,157

Claims priority, application Germany January 7, 1955

15 Claims. (Cl. 88—57)

This invention relates to a telephoto lens; and more particularly to a telephoto lens including a cemented positive meniscus, a cemented negative meniscus disposed a distance away from the positive meniscus, and a single uncemented positive meniscus disposed between the cemented positive meniscus and the cemented negative meniscus a short distance away from the cemented positive meniscus. The cemented positive meniscus is composed of two lenses and the cemented negative meniscus is composed of several lenses.

Aperture ratios of $f/3$ have been attained in known telephoto lenses when certain conditions have been fulfilled. These conditions are as follows: the negative member is cemented and composed of three lenses which have a collective cemented concave surface facing the positive members and a diverging cemented concave surface facing the image plane, the focal length of the cemented positive member lies between 2 to 2.5 times the focal length of the objective, and the focal length of the uncemented lens, having a positive power of refraction, lies between 0.6 and 0.8 times the focal length of the objective. With a telephoto objective of this known type having a focal length $F=100$ mm. and an aperture ratio of $f/3$, being spherically corrected for 94% of the free lens aperture, the spherical zonal aberration could be reduced to 0.120 mm. In this case, however, the second cemented surface of the negative member, whose concave surface faces the image, acts disadvantageously. It causes a comparatively great distortion and deflects the meridional image surface strongly toward positive values and deflects the sagittal image surface to negative values. This results in making the aperture ratio $f/3$ effective only for a relatively small angle of view and, therefore, only usable for long focal lengths.

In photography with hand cameras it is desirable to have a high speed lens. It is also desirable to have a large angle of view which is corrected spherically, for distortion, for image field curvature and for astigmatism for a particular focal length and furthermore provides a high degree of edge brightness. This is especially true for color photography where the ratio of the edge brightness to the brightness in the center of the image must be as great as possible. This factor requires additional corrections but should be currently taken into consideration.

It has now been found, in accordance with this present invention, that a useful aperture ratio of over $f/2.8$, together with most extensive elimination of all image defects, may be provided if the following conditions are satisfied. The cemented negative meniscus must have the concave surfaces of all its lens elements turned toward the positive front members. All cemented surfaces of this negative member must have a collecting effect. Furthermore the focal length of the two-lens cemented positive meniscus must be greater than 2.5 times and less than the 6 times the focal length of the objective. The focal length of the uncemented positive meniscus must be greater than 0.6 times and less than 1.0 times the focal length of the objective. The cemented surface of the positive front member must have a diverging effect, having its concave surface turned toward the object. The maximum difference between the absolute values of the radius of the cemented surface and the radius of the front surface of the cemented positive member must be 15%, and the absolute value of the sum of the radii of the lens surfaces of the three-lens cemented meniscus must lie between 0.5 times and 1.5 times the focal length of the entire system.

In the following Examples I and II of this invention, for focal length $F=100$ mm., aperture ratio $f/2.8$, spherically corrected for a lens opening of 94%; the spherical zonal aberration is reduced to under 0.029 mm., therefore to ⅙ of that presently known. The D line (587.6 m$\mu$) and the G line (435.8 m$\mu$) in this zone are fully corrected, and in the edge and axis zones have maximum deviations of smaller than 0.050 mm. with simultaneous elimination of the color enlargement errors. Astigmatism, image field curvature and coma are, for example at a semi-angular field of view of 7°, practically completely eliminated; and the distortion at this angle of view remains under 0.8%. The brightness of the image edge at this angle of view is 54% greater than the brightness of the center of the image. This telephoto objective is also well corrected for a larger angle than the semi-angular field of view of 7°.

In the case of cameras having interchangeable lenses, screening of the path of rays by mechanical lens-mounts, for example bayonet-type lens mounts, etc., must not take place with a resultant loss of edge-lighting. This loss is prevented by maintaining the distance between the back lens and the image very short and the back lens diameter very small. An important advantage of this invention is accordingly realized by keeping the distance between the back lens and the image less than 21% and the height of passage of the last lens surface on the side of the image smaller than 10% of the focal length of the entire lens.

A simplified modification of this invention includes a cemented negative member consisting of two lenses. Relative aperture ratios have been thereby achieved which are considerably smaller than the ones obtained from the aforementioned modification of this invention.

An aperture ratio of $f/2.8$ with a utilizable image angle of the telephoto lens of about 20°, with simultaneous extensive elimination of all picture errors, was achieved even though the negative member only consisted of two lenses. To accomplish this: the single uncemented positive meniscus is disposed closely behind the two-lens cemented positive member, forming the front lens, in such a way that the air space formed by and between these two members assumes the form of a negative lens; the two-lens cemented negative member is so shaped that the midpoints of curvature of its three lens surfaces lie on the object side of the negative member; the cemented surface of the negative member has a collecting effect; the focal length of the two-lens cemented positive meniscus front member is greater than 2.0 times and less than 7.0 times the focal length of the objective; and the focal length of the uncemented positive meniscus is greater than 0.6 times and less than 0.9 times the focal length of the objective.

It is further advantageous if the cemented surface of the positive-lens front-member acts diverging and its concave surface is turned toward the object.

The system is further improved if the sum of the axial lens thicknesses ($d_4$ and $d_5$) of the meniscus lens elements of the negative member is greater than 0.06 times and less than 0.16 times the focal length F of the objective according to the mathematical equation:

$$0.06\ F < (d_4 + d_5) < 0.16\ F$$

It is furthermore helpful if the air space $l_2$ between the uncemented positive meniscus and the negative member is inclusively between 34% and 45% of the lens focal length, corresponding to the mathematical expression: $0.34\ F \leq l_2 \leq 0.45\ F$.

On the basis of this construction a very desirable correction can be achieved if a spherical undercorrection of suitable size is left in the interaction between the two positive front members. Furthermore the spherical aberration for the two aforementioned light-wave-lengths is eliminated by the arrangement of the single uncemented positive meniscus behind the two-lens cemented positive front member. Simultaneously, the color-enlargement error is eliminated.

In the case of the following Example V of this invention, having the focal length $F=100$ and an aperture ratio of $f/2.8$, the spherical zonal aberration is reduced to 0.04, if the edge spherical aberration is reduced to zero. The D line (587.6 $m\mu$) and G line (435.8 $m\mu$) in the zone are fully corrected, and at the same time the color enlargement error is eliminated. Astigmatism, curvature of field, coma and distortion are completely eliminated to an image angle of up to 20°. This provides a circle of confusion in the focusing plane of a diameter smaller than 0.010 for $F=100$. The illumination of the image edge for the lens opening $f/2.8$ is 50 percent of that at the center of the image.

The additional Examples VI and VII of this invention show that similar results are provided with other distributions of refractive powers.

Figure 2:
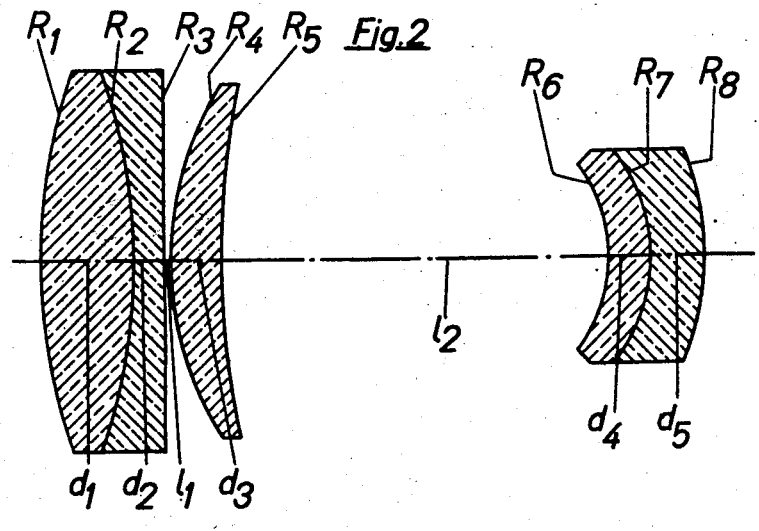

Novel features and advantages of the present invention will become apparent to one skilled in the art from a reading of the following description in conjunction with the accompanying drawings in which:

Fig. 1 is a schematic representation of an embodiment of this invention whose cemented negative member is composed of three lenses, the radii of curvature being designated by $R_1 \ldots R_9$, the axial lens thicknesses being designated by $d_1 \ldots d_6$, and the air spaces being designated by $l_1$ and $[l_2 = b_1 + b_2]$. The sum $b_1 + b_2$ designates the position of the diaphragm in the air space $l_2$. The given figures for radii, thicknesses and air spaces are intended for a lens focal length $F=1.0$ and a relative aperture ratio of $f/2.8$; and Fig. 2 is a schematic representation of a telephoto lens system which is another embodiment of this invention, whose negative member consists of two lenses. Therein the radii of curvature are designated by $R_1 \ldots R_8$, the axial lens thicknesses are designated by $d_1 \ldots d_5$ and the axial air spaces are designated by $l_1$ and $l_2$. The given figures for the radii, axial thicknesses and air spaces pertain to a relative aperture ratio of $f/2.8$ and a corrected image angle of 20 or 15°.

For both figures the refractive indices of the glasses, relative to the D line of the spectrum (587.6 $m\mu$), are designated by $n_d$ and the Abbé numbers or dispersive powers $\nu$ are designated by $\nu$. The back focal length is designated by $s_0'$.

Examples I to IV set forth the optical data for telephoto lenses of the type shown in Fig. 1. Following Example I is a tabulation of the Seidel coefficients and image error summations. This tabulation shows that the distortion term $\Sigma \phi \nu$ is very small, the aperture error $\Sigma A\nu$ can be maintained at low values, and furthermore the image surfaces delineated by $\Sigma III$ and $\Sigma IV$ lie very close together.

EXAMPLE I

*Telephoto lens with the aperture ratio of $f/2.8$*

[F=1.0.]

| Lens | | Glass | |
|---|---|---|---|
| Radius | Thickness or Axial Separation | Refractive Index $n_d$ | Dispersive Power $\nu$ |
| $R_1=+0.59503$ | $d_1=0.08962$ | $n_1=1.5163$ | $\nu_1=64.0$ |
| $R_2=-0.59004$ | $d_2=0.03142$ | $n_2=1.6727$ | $\nu_2=32.2$ |
| $R_3=+2.37023$ | $l_1=0.00470$ | | |
| $R_4=+0.30683$ | $d_3=0.05470$ | $n_3=1.6230$ | $\nu_3=58.1$ |
| $R_5=+0.72960$ | $b_1=0.22129$ | | |
| | $b_2=0.19619$ | | |
| $R_6=-0.11901$ | $d_4=0.02328$ | $n_4=1.6727$ | $\nu_4=32.2$ |
| $R_7=-0.14049$ | $d_5=0.01164$ | $n_5=1.6230$ | $\nu_5=58.1$ |
| $R_8=-0.48094$ | $d_6=0.06634$ | $n_6=1.5174$ | $\nu_6=52.2$ |
| $R_9=-0.16645$ | | | |

*Seidel coefficients and image error sums*

[F=1.00 000.]

| $\nu$ | $A_\nu$ | $B_\nu$ | $\Gamma_\nu$ | $P_\nu$ | $\phi_\nu$ |
|---|---|---|---|---|---|
| 1 | +1.06589 | +0.63424 | +0.37739 | +0.57224 | +0.56506 |
| 2 | −1.62930 | +0.41801 | −0.10724 | −0.10450 | +0.05432 |
| 3 | +0.00025 | +0.00593 | +0.14068 | −0.16967 | −0.68776 |
| 4 | +3.43246 | +1.66440 | +0.80706 | +1.25105 | +0.99798 |
| 5 | +0.06473 | −0.21473 | +0.71233 | −0.52612 | −0.61772 |
| 6 | −3.80684 | −3.74254 | −3.67933 | −3.37921 | −6.93932 |
| 7 | +0.06607 | +0.06616 | +0.06625 | +0.13026 | +0.19677 |
| 8 | +0.00949 | −0.01493 | +0.02348 | +0.08916 | −0.17718 |
| 9 | +0.86706 | +1.27892 | +1.88642 | +2.04854 | +5.80411 |
| Σ | +0.06981 | +0.09546 | +0.22704 | −0.08825 | −0.80374 |

| $\Sigma III$ | $\Sigma IV$ | $\dfrac{\Sigma III + \Sigma IV}{2}$ | $\dfrac{\Sigma III - \Sigma IV}{2}$ |
|---|---|---|---|
| +0.20128 | +0.00826 | +0.10477 | +0.09651 |

EXAMPLE II

*Telephoto lens with the aperture ratio of $f/2.8$*

[F=1.0.]

| Lens | | Glass | |
|---|---|---|---|
| Radius | Thickness or Axial Separation | Refractive Index $n_d$ | Dispersive Power $\nu$ |
| $R_1=+0.61052$ | $d_1=0.09195$ | $n_1=1.5163$ | $\nu_1=64.0$ |
| $R_2=-0.60540$ | $d_2=0.03224$ | $n_2=1.6727$ | $\nu_2=32.2$ |
| $R_3=+2.43193$ | $l_1=0.00483$ | | |
| $R_4=+0.31482$ | $d_3=0.05613$ | $n_3=1.6230$ | $\nu_3=58.1$ |
| $R_5=+0.77959$ | $l_2=0.41839$ | | |
| $R_6=-0.12934$ | $d_4=0.02388$ | $n_4=1.6727$ | $\nu_4=32.2$ |
| $R_7=-0.14415$ | $d_5=0.01195$ | $n_5=1.6230$ | $\nu_5=58.1$ |
| $R_8=-0.49346$ | $d_6=0.06807$ | $n_6=1.5174$ | $\nu_6=52.2$ |
| $R_9=-0.18612$ | | | |

In the case of this lens example, the focal length or the first member, consisting of the surfaces having the radii $R_1$, $R_2$ and $R_3$, is 2.93 times the focal length of the entire system, and the focal length of the second member, consisting of the surfaces having the radii $R_4$ and $R_5$, is 0.81 times the focal length of the system. This telephoto lens is extraordinarily well corrected up to an image angle of 15°.

In accordance with this invention larger lens openings than $f/2.8$ and wider image angles have been achieved with simultaneous maintenance of the highly corrected condition of the lens. The two following examples represent such solutions. Further Examples III and IV demonstrate that objectives with shorter or longer back focal length can be provided in accordance with this invention.

EXAMPLE III

*Telephoto lens with the aperture ratio of f/2.5*

[Corrected image angle 20°. Back focal length=22.4% of the lens focal length. F=1.0.]

| Lens | | Glass | |
|---|---|---|---|
| Radius | Thickness or Axial Separation | Refractive Index $n_d$ | Dispersive Power $v$ |
| $R_1=+0.59006$ | $d_1=0.08962$ | $n_1=1.5163$ | $v_1=64.0$ |
| $R_2=-0.59499$ | $d_2=0.03142$ | $n_2=1.6727$ | $v_2=32.2$ |
| $R_3=+1.88654$ | $l_1=0.00470$ | | |
| $R_4=+0.30683$ | $d_3=0.05470$ | $n_3=1.6228$ | $v_3=56.9$ |
| $R_5=+0.84308$ | $l_2=0.39547$ | | |
| $R_6=-0.12739$ | $d_4=0.02328$ | $n_4=1.6727$ | $v_4=32.2$ |
| $R_7=-0.15067$ | $d_5=0.01164$ | $n_5=1.6230$ | $v_5=58.1$ |
| $R_8=-0.48094$ | $d_6=0.06634$ | $n_6=1.5174$ | $v_6=52.2$ |
| $R_9=-0.18829$ | | | |

The focal length of the first member ($R_1$, $R_2$, $R_3$) amounts to 3.43 times the focal length of the entire system, and the focal length of the second member ($R_4$, $R_5$) amounts to 0.75 times the focal length of the entire system.

EXAMPLE IV

*Telephoto lens with the aperture ratio of f/2.8*

[Corrected image angle 20°. Back focal length=26.7% of the lens focal length. F=1.0.]

| Lens | | Glass | |
|---|---|---|---|
| Radius | Thickness or Axial Separation | Refractive Index $n_d$ | Dispersive Power $v$ |
| $R_1=+0.62344$ | $d_1=0.09048$ | $n_1=1.5190$ | $v_1=57.3$ |
| $R_2=-0.56361$ | $d_2=0.03172$ | $n_2=1.6727$ | $v_2=32.2$ |
| $R_3=+1.67360$ | $l_1=0.00475$ | | |
| $R_4=+0.30978$ | $d_3=0.05522$ | $n_3=1.6230$ | $v_3=58.1$ |
| $R_5=+0.97820$ | $l_2=0.37772$ | | |
| $R_6=-0.14915$ | $d_4=0.02930$ | $n_4=1.6727$ | $v_4=32.2$ |
| $R_7=-0.12564$ | $d_5=0.02641$ | $n_5=1.6254$ | $v_5=35.6$ |
| $R_8=-0.19016$ | $d_6=0.04080$ | $n_6=1.5174$ | $v_6=52.2$ |
| $R_9=-0.27164$ | | | |

The focal length of the first member ($R_1$, $R_2$, $R_3$) amounts to 5.11 times the focal length of the entire system, and the focal length of the second member ($R_4$, $R_5$) amounts to 0.71 times the focal length of the entire system.

It is further advantageous if the cemented surface of the positive lens front member acts diverging, its concave surface is turned toward the object, and the absolute value of its radius $R_2$ differs from the absolute value of $R_1$ by a maximum value of 15% $R_1$.

This system is further improved if the absolute value of the sum of the radii of the lens surfaces of the three-lens cemented negative member lies inclusively between 0.5 times and 1.5 times the focal length of the entire system according to the following mathematical expression:

$$0.5\ F \leq |R_6 + R_7 + R_8 + R_9| \leq 1.5\ F$$

Examples V to VII relate to a telephoto lens in accordance with Fig. 2.

EXAMPLE V

*Telephoto lens with the aperture ratio of f/2.8*

[F=1.0. Angle of view 20°. $s_0'=0.25679$.]

| Lens | | Glass | |
|---|---|---|---|
| Radius | Thickness or Axial Separation | Refractive Index $n_d$ | Dispersive Power $v$ |
| $R_1=+0.62651$ | $d_1=0.09093$ | $n_1=1.51823$ | $v_1=59.0$ |
| $R_2=-0.56639$ | $d_2=0.03188$ | $n_2=1.67270$ | $v_2=32.2$ |
| $R_3=+1.80887$ | $l_1=0.00477$ | | |
| $R_4=+0.31131$ | $d_3=0.05549$ | $n_3=1.62299$ | $v_3=58.1$ |
| $R_5=+0.93444$ | $l_2=0.38539$ | | |
| $R_6=-0.14989$ | $d_4=0.04271$ | $n_4=1.67270$ | $v_4=32.2$ |
| $R_7=-0.16682$ | $d_5=0.05428$ | $n_5=1.51742$ | $v_5=52.2$ |
| $R_8=-0.27175$ | | | |

The focal length of member 1, formed by $R_1$, $R_2$, $R_3$, amounts to +4.57640 F; the focal length of the member 2, formed by $R_4$ and $R_5$, amounts to +0.72458 F.

EXAMPLE VI

*Telephoto lens with the aperture ratio of f/2.8*

[F=1.0. Angle of view 15°. $s_0'=0.22246$.]

| Lens | | Glass | |
|---|---|---|---|
| Radius | Thickness or Axial Separation | Refractive Index $n_d$ | Dispersive Power $v$ |
| $R_1=+0.59808$ | $d_1=0.09008$ | $n_1=1.51633$ | $v_1=64.0$ |
| $R_2=-0.59306$ | $d_2=0.03159$ | $n_2=1.67270$ | $v_2=32.2$ |
| $R_3=+1.85340$ | $l_1=0.00473$ | | |
| $R_4=+0.30841$ | $d_3=0.05498$ | $n_3=1.62280$ | $v_3=56.9$ |
| $R_5=+0.86494$ | $l_2=0.39670$ | | |
| $R_6=-0.12671$ | $d_4=0.02925$ | $n_4=1.67270$ | $v_4=32.2$ |
| $R_7=-0.12348$ | $d_5=0.07254$ | $n_5=1.51742$ | $v_5=52.2$ |
| $R_8=-0.23993$ | | | |

The focal length of member 1 ($R_1$, $R_2$, $R_3$) amounts to +3.66255 F and that of member 2 ($R_4$, $R_5$) amounts to +0.74207 F.

EXAMPLE VII

*Telephoto lens with the aperture ratio of f/2.8*

[F=1.0. Angle of view 20°. $s_0'=0.26527$.]

| Lens | | Glass | |
|---|---|---|---|
| Radius | Thickness or Axial Separation | Refractive Index $n_d$ | Dispersive Power $v$ |
| $R_1=+0.62085$ | $d_1=0.09010$ | $n_1=1.51823$ | $v_1=59.0$ |
| $R_2=-0.56127$ | $d_2=0.03159$ | $n_2=1.67270$ | $v_2=32.2$ |
| $R_3=+1.66665$ | $l_1=0.00473$ | | |
| $R_4=+0.30849$ | $d_3=0.05499$ | $n_3=1.62280$ | $v_3=56.9$ |
| $R_5=+0.97414$ | $l_2=0.37743$ | | |
| $R_6=-0.14853$ | $d_4=0.04232$ | $n_4=1.67270$ | $v_4=32.2$ |
| $R_7=-0.16531$ | $d_5=0.05379$ | $n_5=1.51742$ | $v_5=52.2$ |
| $R_8=-0.26930$ | | | |

The focal length of member 1 ($R_1$, $R_2$, $R_3$) amounts to $+5.25879\ F$ and that of member 2 ($R_4$, $R_5$) amounts to $+0.70261\ F$.

What is claimed is:

1. A photographic telephoto lens comprising a cemented meniscus positive member including two lenses, a cemented meniscus negative member including several lenses disposed a distance away from the positive member, and a single uncemented meniscus positive lens disposed between said cemented positive and negative members at a point close to said positive member, characterized in that said cemented negative member has the concave surfaces of all its lens elements disposed in the direction of said positive front members, the focal length of said two-lens cemented meniscus positive front member is greater than 2.5 times and less than 6.0 times the focal length of the entire system, and the focal length of the uncemented positive meniscus lens is greater than 0.6 times and less than 1.0 times the focal length of the entire system.

2. A lens as set forth in claim 1 characterized in that all the cemented surfaces of the meniscus-shaped negative member have a collecting effect.

3. A lens as set forth in claim 1 characterized in that the absolute value of the radius $R_2$ of the cemented surface of the positive lens front member differs from the absolute value of the radius $R_1$ of the front surface by a maximum value of 15% $R_1$.

4. A lens as set forth in claim 1 wherein said negative cemented member includes three lenses characterized in that the absolute value of the sum of the radii of the lens-surfaces of the three-lens cemented meniscus-shaped negative member lies between 0.5 times and 1.5 times, both inclusive, the focal length of the entire system, corresponding to the mathematical expression:

$$0.5\ F \leq |R_6 + R_7 + R_8 + R_9| \leq 1.5\ F$$

5. A photographic telephoto lens comprising a cemented meniscus positive member including two lenses, a cemented meniscus negative member including two lenses disposed a distance away from the positive member, and a single uncemented meniscus positive lens disposed between said cemented positive and negative members at a point close to said positive member, characterized in that the two-lens cemented negative member is so shaped that the centers of curvature of its three-lens-surfaces lie on the object-side of the negative member whose cemented surface has a collecting effect, the focal length of the two-lens cemented meniscus positive front member is greater than 2.0 times and smaller than 7.0 times the focal length of the entire objective, and the focal length of the uncemented positive meniscus lens is larger than 0.6 times and smaller than 0.9 times the focal length of the entire system.

6. A lens as set forth in claim 5, characterized in that the cemented surface of the positive member acts diverging and its concave surface is turned toward the object.

7. A lens as set forth in claim 5, characterized in that the sum of the axial lens-thicknesses ($d_4$ and $d_5$) of the lens elements of the meniscus negative member is greater than 0.06 times and smaller than 0.16 times the focal length of the entire system according to the mathematical expression:

$$0.06\ F < (d_4\ \text{and}\ d_5) < 0.16\ F$$

8. A lens as set forth in claim 5 characterized in that the air space ($l_2$) between the positive meniscus uncemented lens and the meniscus-shaped negative member assumes a value between 34% and 45%, both inclusive, of the focal length of the entire system, corresponding to the mathematical expression:

$$0.34\ F \leq l_2 \leq 0.45\ F$$

9. A telephoto lens having numerical data with all constructional factors progressively numbered proceeding in a direction towards the image plane, substantially as follows:

[Aperture ratio $f/2.8$    $F=1.0$.]

| Lens | | Glass | |
|---|---|---|---|
| Radius | Thickness or Axial Separation | Refractive Index $n_d$ | Dispersive Power $v$ |
| $R_1=+0.59503$ | $d_1=0.08962$ | $n_1=1.5163$ | $v_1=64.0$ |
| $R_2=-0.59004$ | $d_2=0.03142$ | $n_2=1.6727$ | $v_2=32.2$ |
| $R_3=+2.37023$ | $l_1=0.00470$ | | |
| $R_4=+0.30683$ | $d_3=0.05470$ | $n_3=1.6230$ | $v_3=58.1$ |
| $R_5=+0.72960$ | $b_1=0.22129$ | | |
| | $b_2=0.19619$ | | |
| $R_6=-0.11901$ | $d_4=0.02328$ | $n_4=1.6727$ | $v_4=32.2$ |
| $R_7=-0.14049$ | $d_5=0.01164$ | $n_5=1.6230$ | $v_5=58.1$ |
| $R_8=-0.48094$ | $d_6=0.06634$ | $n_6=1.5174$ | $v_6=52.2$ |
| $R_9=-0.16645$ | | | | in which $R_1, R_2, \ldots$ represent the radii of curvature,
$d_1, d_2, \ldots$ represent the axial thicknesses of the lenses,
$l_1, l_2, \ldots$ represent the axial separating distances,
$n_1, n_2, \ldots$ represent the refractive indices,
$v_1, v_2, \ldots$ represent the dispersive powers, and
the sum $b_1 + b_2$ designates the position of a diaphragm in the air space $l_2$ with $l_2 = b_1 + b_2$.

10. A telephoto lens having numerical data with all constructional factors progressively numbered proceeding in a direction towards the image plane, substantially as follows:

[Aperture ratio $f/2.8$    $F=1.0$.]

| Lens | | Glass | |
|---|---|---|---|
| Radius | Thickness or Axial Separation | Refractive Index $n_d$ | Dispersive Power $v$ |
| $R_1=+0.61052$ | $d_1=0.09195$ | $n_1=1.5163$ | $v_1=64.0$ |
| $R_2=-0.60540$ | $d_2=0.03224$ | $n_2=1.6727$ | $v_2=32.2$ |
| $R_3=+2.43193$ | $l_1=0.00483$ | | |
| $R_4=+0.31482$ | $d_3=0.05613$ | $n_3=1.6230$ | $v_3=58.1$ |
| $R_5=+0.77959$ | $l_2=0.41839$ | | |
| $R_6=-0.12934$ | $d_4=0.02388$ | $n_4=1.6727$ | $v_4=32.2$ |
| $R_7=-0.14415$ | $d_5=0.01195$ | $n_5=1.6230$ | $v_5=58.1$ |
| $R_8=-0.49346$ | $d_6=0.06807$ | $n_6=1.5174$ | $v_6=52.2$ |
| $R_9=-0.18612$ | | | | in which $R_1, R_2, \ldots$ represent the radii of curvature,
$d_1, d_2, \ldots$ represent the axial thicknesses of the lenses,
$l_1, l_2, \ldots$ represent the axial separating distances,
$n_1, n_2, \ldots$ represent the refractive indices, and
$v_1, v_2, \ldots$ represent the dispersive powers.

11. A telephoto lens having numerical data with all constructional factors progressively numbered proceeding in a direction towards the image plane, substantially as follows:

[Aperture Ratio $f/2.5$. $F=1.0$. Corrected image angle 20°. Back focal length=22.4% of the lens focal length.]

| Lens | | Glass | |
|---|---|---|---|
| Radius | Thickness or Axial Separation | Refractive Index $n_d$ | Dispersive Power $v$ |
| $R_1=+0.59006$ | $d_1=0.08962$ | $n_1=1.5163$ | $v_1=64.0$ |
| $R_2=-0.59499$ | $d_2=0.03142$ | $n_2=1.6727$ | $v_2=32.2$ |
| $R_3=+1.88654$ | $l_1=0.00470$ | | |
| $R_4=+0.30683$ | $d_3=0.05470$ | $n_3=1.6228$ | $v_3=56.9$ |
| $R_5=+0.84308$ | $l_2=0.39547$ | | |
| $R_6=-0.12739$ | $d_4=0.02328$ | $n_4=1.6727$ | $v_4=32.2$ |
| $R_7=-0.15067$ | $d_5=0.01164$ | $n_5=1.6230$ | $v_5=58.1$ |
| $R_8=-0.48094$ | $d_6=0.06634$ | $n_6=1.5174$ | $v_6=52.2$ |
| $R_9=-0.18829$ | | | | in which $R_1, R_2, \ldots$ represent the radii of curvature,
$d_1, d_2, \ldots$ represent the axial thicknesses of the lenses,
$l_1, l_2, \ldots$ represent the axial separating distances,
$n_1, n_2, \ldots$ represent the refractive indices, and
$v_1, v_2, \ldots$ represent the dispersive powers.

12. A telephoto lens having numerical data with all constructional factors progressively numbered proceeding in a direction towards the image plane, substantially as follows:

[Aperture ratio $f/2.8$. $F=1.0$. Corrected image angle 20°. Back focal length=26.7% of the lens focal length.]

| Lens | | Glass | |
|---|---|---|---|
| Radius | Thickness or Axial Separation | Refractive Index $n_d$ | Dispersive Power $v$ |
| $R_1=+0.62344$ | $d_1=0.09048$ | $n_1=1.5190$ | $v_1=57.3$ |
| $R_2=-0.56361$ | $d_2=0.03172$ | $n_2=1.6727$ | $v_2=32.2$ |
| $R_3=+1.67360$ | $l_1=0.00475$ | | |
| $R_4=+0.30978$ | $d_3=0.05522$ | $n_3=1.6230$ | $v_3=58.1$ |
| $R_5=+0.97820$ | $l_2=0.37772$ | | |
| $R_6=-0.14915$ | $d_4=0.02930$ | $n_4=1.6727$ | $v_4=32.2$ |
| $R_7=-0.12564$ | $d_5=0.02641$ | $n_5=1.6254$ | $v_5=35.6$ |
| $R_8=-0.19016$ | $d_6=0.04080$ | $n_6=1.5174$ | $v_6=52.2$ |
| $R_9=-0.27164$ | | | | in which $R_1, R_2, \ldots$ represent the radii of curvature,
$d_1, d_2, \ldots$ represent the axial thicknesses of the lenses,
$l_1, l_2, \ldots$ represent the axial separating distances,
$n_1, n_2, \ldots$ represent the refractive indices, and
$v_1, v_2, \ldots$ represent the dispersive powers.

13. A telephoto lens having numerical data with all constructional factors progressively numbered proceeding in a direction towards the image plane, substantially as follows:

[Aperture ratio $f/2.8$. $F=1.0$. $s_0'=0.25679$. Angle of view 20°.]

| Lens | | Glass | |
|---|---|---|---|
| Radius | Thickness or Axial Separation | Refractive Index $n_d$ | Dispersive Power $v$ |
| $R_1=+0.62651$ | $d_1=0.09093$ | $n_1=1.51823$ | $v_1=59.0$ |
| $R_2=-0.56639$ | $d_2=0.03188$ | $n_2=1.67270$ | $v_2=32.2$ |
| $R_3=+1.80887$ | $l_1=0.00477$ | | |
| $R_4=+0.31131$ | $d_3=0.05549$ | $n_3=1.62299$ | $v_3=58.1$ |
| $R_5=+0.93444$ | $l_2=0.38539$ | | |
| $R_6=-0.14989$ | $d_4=0.04271$ | $n_4=1.67270$ | $v_4=32.2$ |
| $R_7=-0.16682$ | $d_5=0.05428$ | $n_5=1.51742$ | $v_5=52.2$ |
| $R_8=-0.27175$ | | | | in which $R_1, R_2, \ldots$ represent the radii of curvature,
$d_1, d_2, \ldots$ represent the axial thicknesses of the lenses,
$l_1, l_2, \ldots$ represent the axial separating distances,
$n_1, n_2, \ldots$ represent the refractive indices,
$v_1, v_2, \ldots$ represent the dispersive powers, and
$s_0' \ldots$ represents the back focal length.

14. A telephoto lens having numerical data with all constructional factors progressively numbered proceeding in a direction towards the image plane, substantially as follows:

[Aperture ratio $f/2.8$. $F=1.0$. $s_0'=0.22246$. Angle of view 15°.]

| Lens | | Glass | |
|---|---|---|---|
| Radius | Thickness or Axial Separation | Refractive Index $n_d$ | Dispersive Power $v$ |
| $R_1=+0.59808$ | $d_1=0.09008$ | $n_1=1.51633$ | $v_1=64.0$ |
| $R_2=-0.59306$ | $d_2=0.03159$ | $n_2=1.67270$ | $v_2=32.2$ |
| $R_3=+1.85340$ | $l_1=0.00473$ | | |
| $R_4=+0.30841$ | $d_3=0.05498$ | $n_3=1.62280$ | $v_3=56.9$ |
| $R_5=+0.86494$ | $l_2=0.39670$ | | |
| $R_6=-0.12671$ | $d_4=0.02925$ | $n_4=1.67270$ | $v_4=32.2$ |
| $R_7=-0.12348$ | $d_5=0.07254$ | $n_5=1.51742$ | $v_5=52.2$ |
| $R_8=-0.23993$ | | | | in which $R_1, R_2, \ldots$ represent the radii of curvature,
$d_1, d_2, \ldots$ represent the axial thicknesses of the lenses,
$l_1, l_2, \ldots$ represent the axial separating distances,
$n_1, n_2, \ldots$ represent the refractive indices,
$v_1, v_2, \ldots$ represent the dispersive powers, and
$s_0' \ldots$ represents the back focal length.

15. A telephoto lens having numerical data with all constructional factors progressively numbered proceeding in a direction towards the image plane, substantially as follows:

[Aperture ratio f/2.8. F=1.0. $s_0'$=0.26527. Angle of view 20°.]

| Lens | | Glass | |
|---|---|---|---|
| Radius | Thickness or Axial Separation | Refractive Index $n_d$ | Dispersive Power $v$ |
| $R_1$=+0.62085 | $d_1$=0.09010 | $n_1$=1.51823 | $v_1$=59.0 |
| $R_2$=−0.56127 | $d_2$=0.03159 | $n_2$=1.67270 | $v_2$=32.2 |
| $R_3$=+1.66665 | $l_1$=0.00473 | | |
| $R_4$=+0.30849 | $d_3$=0.05499 | $n_3$=1.62280 | $v_3$=56.9 |
| $R_5$=+0.97414 | $l_2$=0.37743 | | |
| $R_6$=−0.14853 | | | |
| $R_7$=−0.16531 | $d_4$=0.04232 | $n_4$=1.67270 | $v_4$=32.2 |
| $R_8$=−0.26930 | $d_5$=0.05379 | $n_5$=1.51742 | $v_5$=52.2 | in which $R_1$, $R_2$, ... represent the radii of curvature,
$d_1$, $d_2$, ... represent the axial thicknesses of the lenses,
$l_1$, $l_2$, ... represent the axial separating distances,
$n_1$, $n_2$, ... represent the refractive indices,
$v_1$, $v_2$, ... represent the dispersive powers, and
$s_0'$ ... represents the back focal length.

References Cited in the file of this patent

UNITED STATES PATENTS

| | | |
|---|---|---|
| 2,321,973 | Bennett | June 15, 1943 |
| 2,378,170 | Aklin | June 12, 1945 |

FOREIGN PATENTS

| | | |
|---|---|---|
| 316,246 | Germany | Nov. 24, 1919 |
| 318,178 | Germany | Jan. 15, 1920 |
| 398,431 | Germany | July 14, 1924 |
| 222,709 | Great Britain | Oct. 9, 1924 |
| 861,161 | Germany | Dec. 29, 1952 |